United States Patent
Watanabe et al.

(10) Patent No.: US 6,642,958 B2
(45) Date of Patent: Nov. 4, 2003

(54) IMAGE PICKUP SYSTEM AND PICKED-UP IMAGE SIGNAL PROCESSING APPARATUS

(75) Inventors: Gaku Watanabe, Tokyo (JP); Kenichi Kondo, Kanagawa-ken (JP); Nobuo Fukushima, Kanagawa-ken (JP); Masayoshi Sekine, Tokyo (JP); Koichi Sono, Kanagawa-ken (JP); Motohiro Ishikawa, Kanagawa-ken (JP); Yuji Koide, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 137 days.

(21) Appl. No.: 09/368,829

(22) Filed: Aug. 5, 1999

(65) Prior Publication Data

US 2002/0109778 A1 Aug. 15, 2002

Related U.S. Application Data

(63) Continuation of application No. 08/684,544, filed on Jul. 19, 1996, now Pat. No. 5,978,020.

(30) Foreign Application Priority Data

Jul. 24, 1995 (JP) .............................................. 7-187213

(51) Int. Cl.⁷ ................................................ H04N 7/18
(52) U.S. Cl. ........................ 348/231; 348/233; 348/552
(58) Field of Search .................................. 348/231, 233, 348/207–235, 552; 375/240.25

(56) References Cited

U.S. PATENT DOCUMENTS

| | | | | | |
|---|---|---|---|---|---|
| 5,418,568 A | * | 5/1995 | Keith | .......................... | 348/390 |
| 5,471,577 A | * | 11/1995 | Lightbody | .................. | 348/552 |
| 5,477,264 A | * | 12/1995 | Sarbadhikari | ............... | 348/552 |
| 5,568,192 A | * | 10/1996 | Hannah | ....................... | 348/390 |
| 5,631,701 A | * | 4/1997 | Miyake | ....................... | 348/552 |
| 5,734,425 A | * | 3/1998 | Takizawa | ..................... | 348/552 |

FOREIGN PATENT DOCUMENTS

| | | | | | |
|---|---|---|---|---|---|
| EP | 0617542 | * | 9/1994 | ............ | H04N/1/21 |
| JP | 7-184093 | * | 7/1995 | .......... | H04N/5/225 |
| WO | 94/14274 | * | 6/1994 | ............ | H04N/1/21 |

* cited by examiner

Primary Examiner—Andy Rao
(74) Attorney, Agent, or Firm—Robin, Blecker & Daley

(57) ABSTRACT

In an image pickup system, an image pickup unit is connected to a computer which has a display device. In order to make a display by matching the characteristic of the image pickup unit with that of the display device, the image pickup unit is provided with a control part which is arranged to measure a signal processing speed of the computer, to compare the signal processing speed with an image pickup speed or a picked-up image data output speed of the image pickup unit and to vary an image pickup action or a picked-up image data output action of the image pickup unit according to a result of the comparison or according to an operation performed by an operator of the image pickup system.

22 Claims, 6 Drawing Sheets

IMAGE PICKUP SYSTEM AND PICKED-UP IMAGE SIGNAL PROCESSING APPARATUS

CROSS REFERENCE TO RELATED APPLICATIONS

This application is a continuation of application Ser. No. 08/684,544, filed Jul. 19, 1996, now U.S. Pat. No. 5,978,020.

BACKGROUND OF THE INVENTION

1. Field of the Invention

The present invention relates to an image pickup system in which an image pickup unit is connected for use to an external apparatus arranged to process images.

2. Description of the Related Art

Computers having connection terminals of the PCMCIA standards are generally arranged to be usable with card-shaped units of various functions inserted therein as a facsimile, a memory, etc. The connection terminal permits use of each of the various card-shaped units by replacing one with another so long as they meet the PCMCIA standards. The connection terminal thus permits selective use of card-shaped units of various functions as desired by the operator.

FIG. 7 shows by way of example an image pickup system which is composed of a computer having the above-stated connection terminal and an image pickup unit which is removably attachable to the computer.

The illustration of FIG. 7 includes a card-shaped image pickup unit 21, computers 22, 24 and 26 which are usable in the image pickup system, and connection terminals 23, 25 and 27 which are respectively arranged to connect the image pickup unit 21 to the computers 22, 24 and 26. A case where the image pickup system is formed by connecting the image pickup unit 21 to the connection terminal 23 is first described as follows.

Referring to FIG. 7, an image is picked up by an optical system and a CCD which are included in the image pickup unit 21. The image picked up is converted into digital image data. The picked-up image data thus obtained is transferred through the connection terminal 23 to the computer 22 at a predetermined speed.

The image pickup unit 21 sends the picked-up image data which includes a color signal to the computer 22 at a rate of n frames per sec. The computer 22 then processes the n-frames/sec picked-up image data sent from the image pickup unit 21 and is capable of displaying the picked-up image data on a built-in color display device or recording the picked-up image data in a built-in recording device.

The use of the computer 22 may be replaced with the use of the computer 24. The computer 24 is provided with the connection terminal 25 which conforms to the same standards as the connection terminal 23 of the computer 22 and a color display device which is similar to that of the computer 22.

Since the connection terminal 25 is of the same specifications as the connection terminal 23, the image pickup unit 21 can be connected to the connection terminal 25. With the image pickup unit 21 connected to the connection terminal 25, the computer 24 displays and records the picked-up image data obtained from the image pickup unit 21 in the same manner as when the image pickup unit 21 is connected to the computer 22.

The operator of the image pickup system can use either the computer 22 or the computer 24 and also can use the image pickup unit 21 in common with them.

This arrangement of the image pickup system, however, has presented the following problems.

In the image pickup system shown in FIG. 7, a case where the computer 26 is used will be considered. The computer 26 has a less amount of consumption of electric power and less weight than the computers 22 and 24, but has a slower processing speed than the computers 22 and 24 and has only a monochrome display device instead of a color display device.

Since the connection terminal 27 also conforms with the same standards as the connection terminals 23 and 25, the computer 26 is capable of exchanging data with the image pickup unit 21 as connected to the connection terminal 27. However, since the processing speed of the computer 26 is too slow, it is impossible to completely process the picked-up image data being sent from the image pickup unit 21. As a result, the picked-up image data tends to be lost in part or an image pickup operation sometimes comes to a stop.

Besides, in such a case, it is impossible to utilize color information included in the picked-up image data sent from the image pickup unit 21 as the computer 26 is provided with only a monochrome display device.

SUMMARY OF THE INVENTION

The present invention is directed to the solution of the above-stated problem of the prior art. It is, therefore, an object of the invention to provide an image pickup system which is composed of at least one image pickup unit and at least one computer and a picked-up image signal processing apparatus, which are capable of utilizing the characteristics and performance of the computer to a maximum extent and also capable of solving the problems caused by a difference in data processing speed and in display device between one computer and another.

To attain the above object, an image pickup system according to the invention is configured as follows. (1) An image pickup system is composed of an image pickup unit which has a connection terminal for connection with an external apparatus and which is arranged to pick up an image to output picked-up image data from the connection terminal and at least one external apparatus which is connected to the image pickup unit. The image pickup unit comprises data exchange means for exchanging data with the external apparatus connected, processing-speed detection means for measuring or predicting a processing speed of the external apparatus connected, speed comparison means for making a comparison between the processing speed of the external apparatus detected by the processing-speed detection means and an image pickup speed or a picked-up image data output speed of the image pickup unit, and varying control means for varying an image pickup action or a picked-up image data output action of the image pickup unit according to a result of the comparison made by the speed comparison means or according to an operation performed by an operator of the image pickup system. (2) An image pickup system is arranged to include, in addition to the arrangement of the system defined by Para. (1) above, informing means for informing one of or all of the operator of the image pickup system, the external apparatus and the image pickup unit of the result of the comparison made by the speed comparison means. (3) An image pickup system is arranged to include, in addition to the arrangement of the system defined by Para. (1) or (2) above, Dm detection means for measuring or predicting a maximum amount Dm of picked-up image data transferable per unit time to the external apparatus connected, and data amount comparison means for making a comparison between the detected maximum amount Dm of picked-up image data and an amount Sp of picked-up image data being outputted per unit time by the image pickup unit. (4) An image pickup system is arranged to include, in addition to the arrangement of the system defined by Para. (1) or (3) above, operation clock detection means for measuring or predicting an operation clock speed of the external apparatus. In the system, the speed comparison means compares the image pickup speed of the image pickup unit with the operation clock speed of the external apparatus measured or predicted by the operation clock detection means. (5) In the image pickup system defined by any one of Para. (1) to (4) above, when the image pickup unit obtains a plurality of pixel data, the varying control means selects and outputs at least one pixel data from among the plurality of pixel data. (6) In the image pickup system defined by any one of Para. (1) to (5) above, the varying control means is arranged to vary the number of frames of images to be picked up per unit time by the image pickup unit. (7) In the image pickup system defined by any one of Para. (1) to (6) above, the varying control means is arranged to select and output picked-up image data for at least one picture from among picked-up image data for a plurality of pictures being sent out at intervals of a predetermined length of time from the image pickup unit. (8) In the image pickup system defined by any one of Para. (1) to (7) above, when the image pickup unit obtains picked-up image data for one frame composed of a plurality of pixel rows, the varying control means selects and outputs picked-up image data for a fewer number of pixel rows than the plurality of pixel rows. (9) In the image pickup system defined by any one of Para. (1) to (8) above, when the image pickup unit obtains picked-up image data for one frame composed of a plural number of colors, the varying control means selects and outputs data for an arbitrary number of colors from among the picked-up image data. (10) In the image pickup system defined by any one of Para. (1) to (9) above, the varying control means is arranged to increase or decrease an amount of information carried by each of pixels with which the image pickup unit forms the picked-up image data. (11) An image pickup system is composed of an image pickup unit which has a connection terminal for connection with an external apparatus and which is arranged to pick up an image to output picked-up image data from the connection terminal and at least one external apparatus which is connected to the image pickup unit. The image pickup unit comprises data exchange means for exchanging data with the external apparatus connected, comparison means for making a comparison between an image displaying method of the external apparatus and an image pickup method of the image pickup unit, and varying control means for varying an image pickup action or a picked-up image data output action of the image pickup unit according to a result of the comparison made by the comparison means or according to an operation performed by an operator of the image pickup system. (12) An image pickup system is arranged to include, in addition to the arrangement of the system defined by Para. (11) above, display varying means for varying the image displaying method of the external apparatus according to the result of the comparison made by the comparison means or according to the operation performed by the operator of the image pickup system. (13) An image pickup system is arranged to include, in addition to the arrangement of the system defined by Para. (11) above, informing means for informing one of or all of the operator of the image pickup system, the external apparatus and the image pickup unit of the result of the comparison made by the comparison means. (14) In the image pickup system defined by any one of Para. (11) to (13) above, when the image pickup unit obtains a plurality of pixel data, the varying control means selects and outputs at least one pixel data from among the plurality of pixel data. (15) In the image pickup system defined by any one of Para. (11) to (14) above, the varying control means is arranged to vary the number of frames of images to be picked up per unit time by the image pickup unit. (16) In the image pickup system defined by any one of Para. (11) to (15) above, the varying control means is arranged to select and output picked-up image data for at least one picture from among picked-up image data for a plurality of pictures being sent out at intervals of a predetermined length of time from the image pickup unit. (17) In the image pickup system defined by any one of Para. (11) to (16) above, when the image pickup unit obtains picked-up image data for one frame composed of a plurality of pixel rows, the varying control means selects and outputs picked-up image data for a fewer number of pixel rows than the plurality of pixel rows. (18) In the image pickup system defined by any one of Para. (11) to (17) above, when the image pickup unit obtains picked-up image data for one frame composed of a plural number of colors, the varying control means selects and outputs data for an arbitrary number of colors from among the picked-up image data. (19) In the image pickup system defined by any one of Para. (11) to (18) above, the varying control means is arranged to increase or decrease an amount of information carried by each of pixels with which the image pickup unit forms the picked-up image data. (20) In the image pickup system defined by Para. (11), the image pickup unit includes display speed detection means for detecting or predicting a display speed of an image display device included in the external apparatus connected. (21) In the image pickup system defined by Para. (11), the image pickup unit includes resolution detection means for detecting or predicting a resolution of an image display device included in the external apparatus connected. (22) In the image pickup system defined by Para. (11), the image pickup unit includes color information amount detection means for detecting or predicting an amount of color information to be displayed by an image display device included in the external apparatus connected. (23) An image pickup unit comprises image pickup means for picking up an optical image to form a picked-up image signal, communication means for performing communication with an external signal processing apparatus, and control means for receiving information on a processing capability characteristic of the external signal processing apparatus and changing an image pickup mode of the image pickup means on the basis of the information on the processing capability characteristic. (24) The image pickup unit defined by Para. (23) above is arranged to be removably attachable to the external signal processing apparatus. (25) In the image pickup unit defined by Para. (23) above, the control means is arranged to receive information on an internal operation speed of the external signal processing apparatus. (26) In the image pickup unit defined by Para. (23) above, the control means is arranged to receive information on a display capability of a display device included in the external signal processing apparatus. (27) In the image pickup unit defined by Para. (23) above, the control means is arranged to change the image pickup mode by changing an amount of information per unit time of the picked-up image signal to be formed by the image pickup means. (28) In the image pickup unit defined by Para. (23) above, the control means is arranged to change the image pickup mode by changing an amount of color information of the picked-up image signal to be formed by the image pickup means. (29) A picked-up image signal processing apparatus comprises communication means for performing communication with an image pickup unit including image pickup means for picking up an optical image to form a picked-up image signal, and control means for transmitting to the image pickup unit a processing capability characteristic of signal processing means included in the picked-up image signal processing apparatus and controlling and changing an image pickup mode of the image pickup means included in the image pickup unit according to the processing capability characteristic of the signal processing means. (30) In the picked-up image signal processing apparatus defined by Para. (29) above, the image pickup unit is arranged to be removably attachable to the picked-up image signal processing apparatus. (31) In the picked-up image signal processing apparatus defined by Para. (29) above, the control means is arranged to transmit information on an operation speed of the signal processing means to the image pickup unit. (32) In the picked-up image signal processing apparatus defined by Para. (29) above, the control means is arranged to transmit information on a display capability of the signal processing means to the image pickup unit. (33) In the picked-up image signal processing apparatus defined by Para. (29) above, the control means is arranged to change the image pickup mode by changing an amount of information per unit time of the picked-up image signal to be formed by the image pickup unit. (34) In the picked-up image signal processing apparatus defined by Para. (29) above, the control means is arranged to change the image pickup mode by changing an amount of color information of the picked-up image signal to be formed by the image pickup unit.

The object of the invention can be attained by the arrangements described above.

Further, in an image pickup system composed of at least one computer which has at least one connection terminal and at least one image pickup unit which is detachably connectable to the connection terminal, the image pickup unit connected to the connection terminal of the computer comprises means for exchanging data with the computer, means for measuring or predicting a processing speed of the computer, means for making a comparison between the processing speed and an image pickup speed of the image pickup unit, and means for varying an image pickup action of the image pickup unit according to a result of the comparison.

Further, in an image pickup system composed of at least one computer which has at least one connection terminal and at least one image pickup unit which is detachably connectable to the connection terminal, the image pickup unit connected to the connection terminal of the computer comprises means for exchanging data with the computer, means for making a comparison between an image display method of the computer and an image pickup method of the image pickup unit, and means for varying an image pickup action of the image pickup unit according to a result of the comparison.

The provision of these means arranged according to the invention enables the image pickup system to fully utilize the features and performance of the computer and also to solve the problems resulting from differences relative to the data processing speed and the display device of the computer.

The above and further objects and features of the invention will become apparent from the following detailed description of embodiments thereof taken in conjunction with the accompanying drawings.

DETAILED DESCRIPTION OF THE PREFERRED EMBODIMENTS

Preferred Embodiments of the invention are described below with reference to the drawings.

(First Embodiment)

A first embodiment of the invention is described with reference to FIGS. 1 and 2 as follows.

Figure 1:
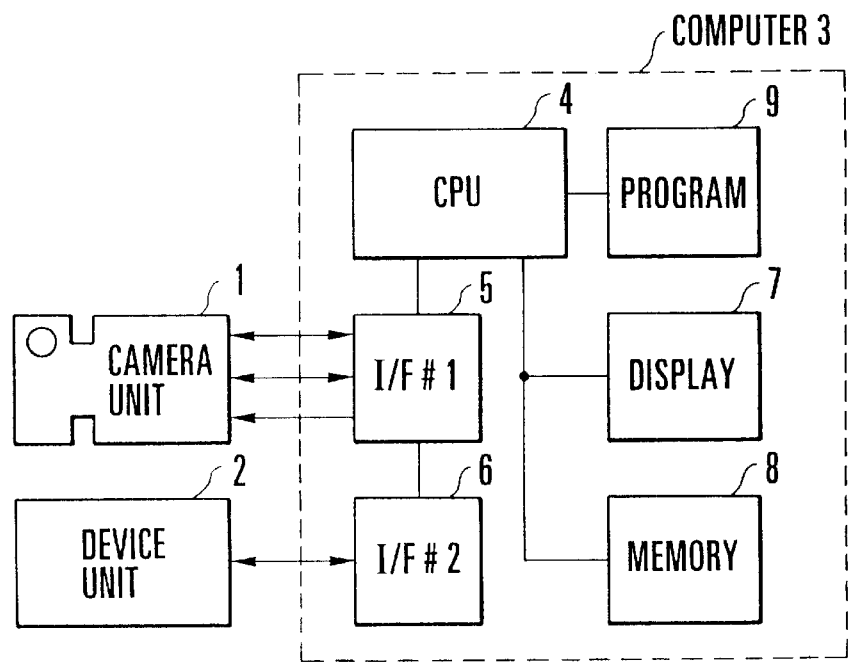
FIG. 1 is a block diagram showing the arrangement of a first embodiment of the invention.

FIG. 1 is a block diagram showing an image pickup system arranged according to the invention as the first embodiment of the invention. FIG. 2 is a block diagram showing an image pickup unit of the first embodiment.

Referring to FIG. 1, the illustration includes an image pickup unit 1, a device unit 2 which is of connection specifications equivalent to those of the image pickup unit 1, a computer 3, a CPU 4 of the computer 3, connection terminals 5 and 6 of the computer 3, a display device 7 of the computer 3, a memory device 8 of the computer 3, and an operation program 9 of the CPU 4.

Figure 2:
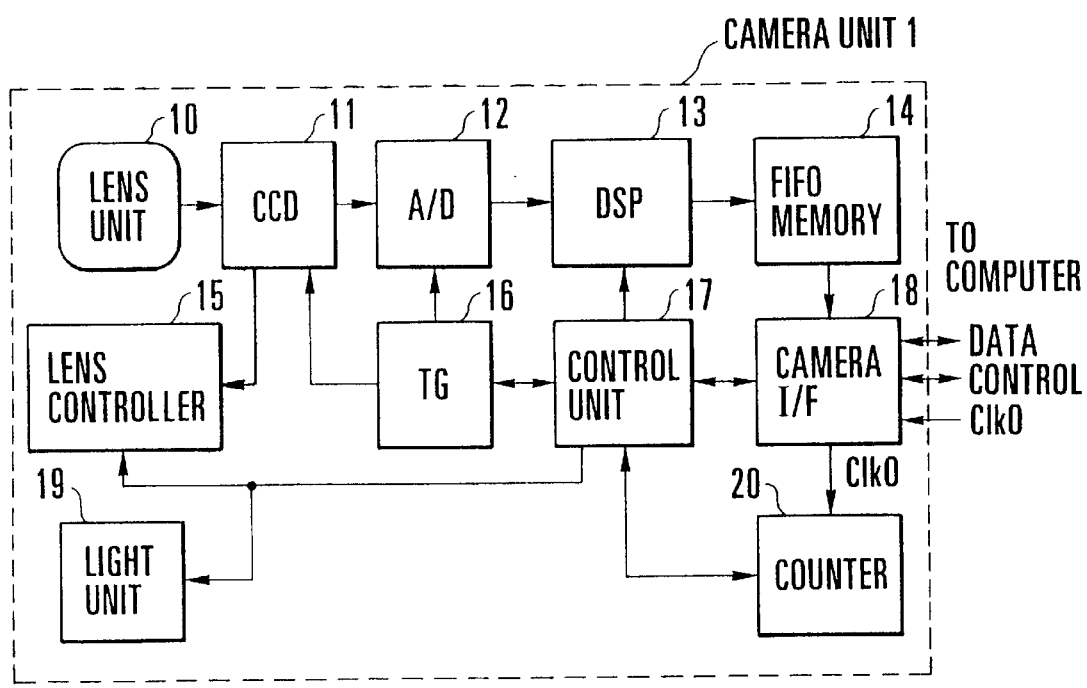
FIG. 2 is a block diagram showing the arrangement of an image pickup unit of the first embodiment.

Referring to FIG. 2 which shows in a block diagram the arrangement of the image pickup unit 1, the illustration includes a lens unit 10, a CCD 11, an A/D converter 12, a digital signal processing device (DSP) 13, a FIFO memory 14, a lens controller 15 which controls the lens unit 10 and includes an automatic focusing device and an automatic image stabilizing (image-shake preventing) device which are known, a timing generator (TG) 16 arranged to send out timing pulses to the CCD 11 and the A/D converter 12, a control unit 17 disposed within the image pickup unit 1, an interface (camera I/F) 18 provided for external connection, a light unit 19 arranged at the image pickup unit 1 to illuminate an object of shooting, and a counter 20 arranged to divide the frequency of input clock pulses and outputs frequency-divided clock pulses (to be used in a second embodiment).

The image pickup system picks up images with the image pickup unit 1 connected to the computer 3.

(Pickup of Still Image)

Figure 3:
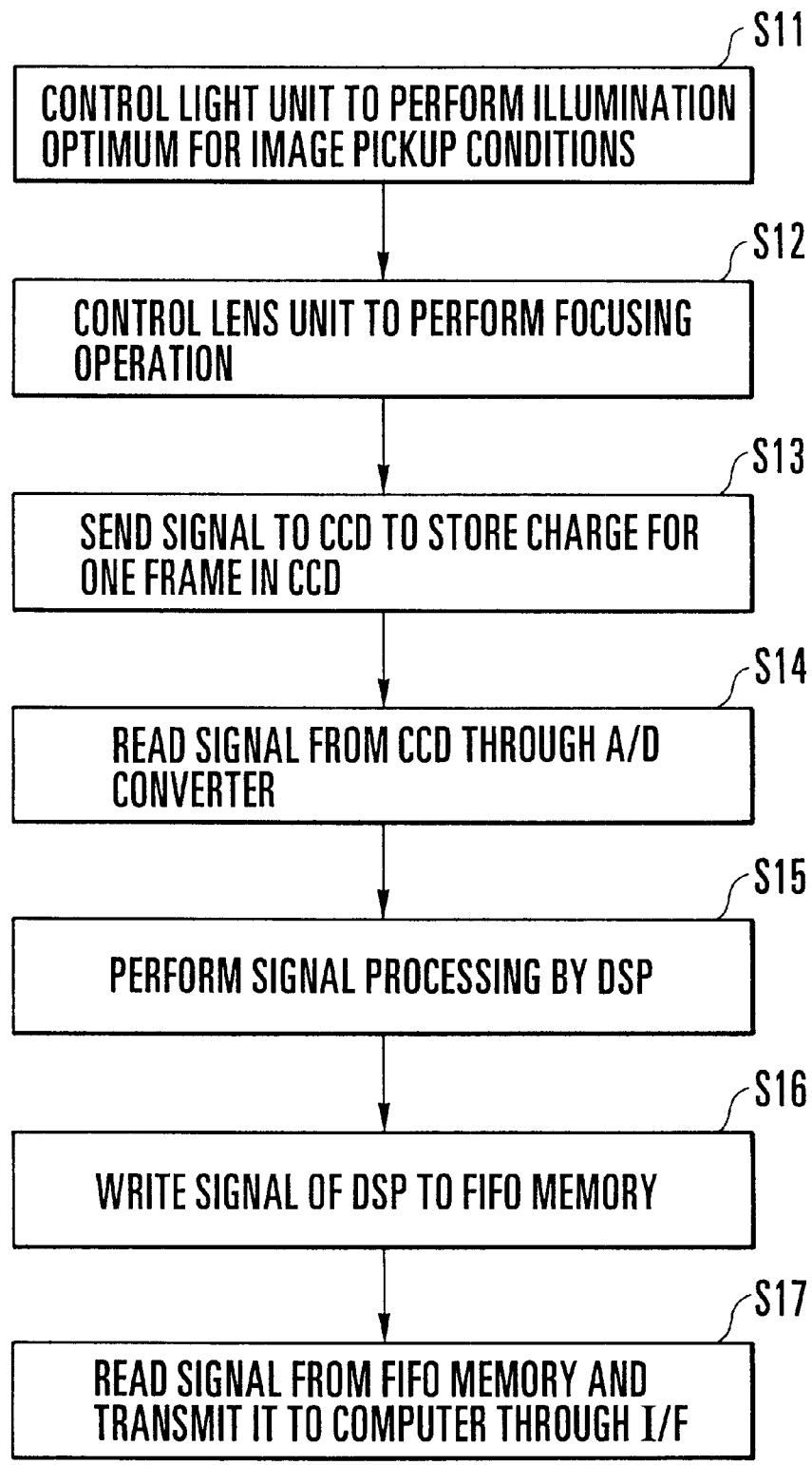
FIG. 3 is a flow chart showing an image pickup operation for one frame in the first embodiment.

An operation of picking up an image for one frame is first described with reference to FIGS. 1 and 2 and FIG. 3 which is a flow chart. The control unit 17 of the image pickup unit 1 controls this operation. Various control actions performed at steps S11 to S17 shown in FIG. 3 will be described.

At the step S11, the control unit 17 causes the CCD 11 to measure the luminance of an object of shooting. After that, the light unit 19 is controlled to illuminate the object to give a condition best suited for taking a shot.

At the step S12, the lens unit 10 is caused through the lens controller 15 to perform a focusing action. The image stabilizing device is also used if necessary.

At the step S13, image information for one frame is stored as electric charge at the CCD 11 through the lens unit 10. This control is performed by the control unit 17. The timing of reading from the CCD 11 is decided by timing pulses sent from the TG 16. The electric charge storing time of the CCD 11 is decided by the control unit 17 according to the luminance of the object obtained at the step S11.

At the step S14, the A/D converter 12 is caused to read out image data for one frame stored at the CCD 11. A digital image signal obtained by the A/D converter 12 is supplied to the DSP 13 to be converted into a Y (luminance) signal and color-difference signals. These signals are converted further into R, G and B signals. The A/D converting speed of the A/D converter 12 and the operation of the CCD 11 are decided by the timing pulses sent from the TG 16. The TG 16 has different operation pulse output modes including a mode 0 to a mode 3.

In the mode 0, a signal for one frame is taken in every time a control signal is received from the control unit 17. In the mode 1, operation pulses are sent to the CCD 11 and the A/D converter 12 in such a way as to cause picked-up image data for five frames to be outputted per sec from the DSP 13. In the mode 2, operation pulses are sent to the CCD 11 and the A/D converter 12 in such a way as to cause picked-up image data for fifteen frames to be outputted per sec from the DSP 13. In the mode 3, operation pulses are sent to the CCD 11 and the A/D converter 12 in such a way as to cause picked-up image data for thirty frames to be outputted per sec from the DSP 13. In the case of FIG. 3, the flow of operation is assumed to be executed in the mode 0.

At the step S15, the DSP 13 is caused to process the output of the A/D converter 12. In this case, the Y and color-difference signals are converted into R, G and B signals. The DSP 13 has R, G and B outputs. From these outputs, the R, G and B signals are simultaneously outputted at a time on a line-by-line basis. In this case, one frame consists of 250 lines.

At the step S16, signals outputted from the DSP 13 are temporarily stored in the FIFO memory 14, which has a storage capacity of three frames.

At the step S17, the signals are read out from the FIFO memory 14 and sent to the computer 3 through the interface 18.

A still image for one frame can be obtained through the steps S11 to S17 described above.

In the computer 3, the image data obtained from the image pickup unit 1 is displayed on the display device 7 and, at the same time, is stored in the memory device 8. If necessary, the computer 3 transfers the image data to the device unit 2. The operation of the computer 3 is decided by the operation program 9.

(Pickup of Moving Image)

In the case of this embodiment, the image pickup system is capable of taking a moving image by continuously taking still images as described above. The moving image taking operation is next described below with reference to FIGS. 1, 2, 4 and 5.

In taking a moving image, the flow of operation of the image pickup system is divided into a routine A and a routine B. In the routine A, picked-up image data read out from the CCD 11 is continuously written into the FIFO memory 14. In the routine B, the picked-up image data is read out from the FIFO memory 14 and is sent out continuously to the computer 3 through the interface 18. The control unit 17 simultaneously executes the routine A and the routine B. By performing the routine A and the routine B, an image pickup operation can be carried on in a manner suited to the processing speed of the computer 3. The routine A is as shown in a flow chart in FIG. 4, while the routine B is shown also in a flow chart in FIG. 5.

Figure 4:
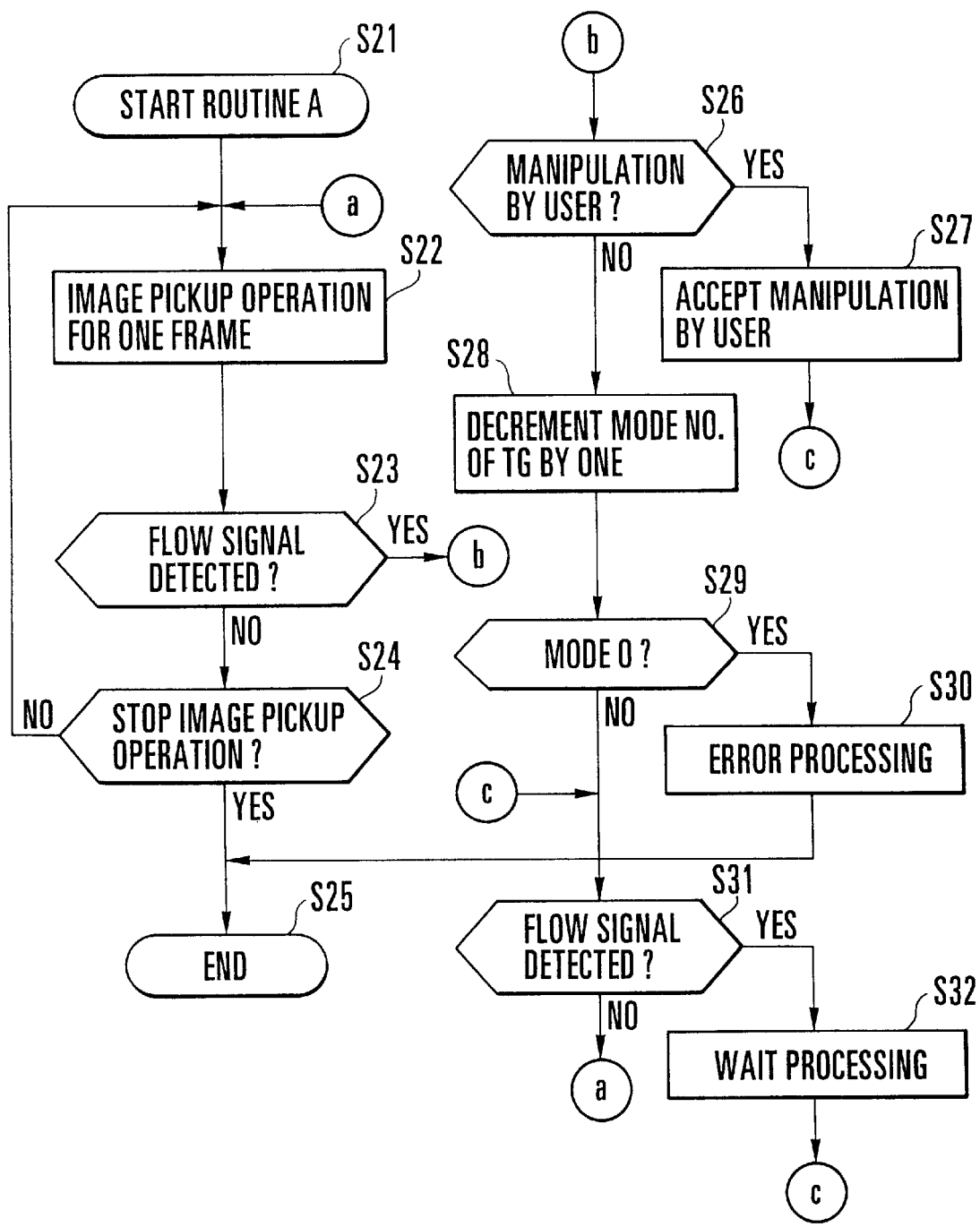
FIG. 4 is a flow chart showing a moving image pickup routine A in the first embodiment.

The routine A is first described with reference to FIGS. 1, 2 and 4 as follows.

At a step S21, the routine A begins. The following actions are all executed by the control unit 17.

At a step S22, picked-up image data for one frame is obtained in the same manner as the still image taking procedures described above. The image data thus obtained is stored in the FIFO memory 14.

At a step S23, a check is made for a vacancy in the storage capacity of the FIFO memory 14. The FIFO memory 14 of the image pickup unit 1 is capable of storing image data for three frames. When image data for three frames has been written in the FIFO memory 14, the FIFO memory sends a flow signal to the control unit 17. The control unit 17 can find if there is a vacancy in the FIFO memory 14 through the flow signal.

Since the control unit 17 is arranged to execute both the routine A which is for writing into the FIFO memory 14 and the routine B which is for reading from the FIFO memory 14, the flow signal being sent from the FIFO memory 14 indicates that the action of reading from the FIFO memory 14 is slower than the action of writing into the FIFO memory 14. In other words, in such a case, the amount of image data picked up per unit time is larger than that of image data processed by the computer 3. Then, in this case, it is necessary to decrease the amount of image data picked up per unit time.

If the flow signal is detected at the step S23, the flow comes to a step S26. If not, the flow comes to a step S24.

At the step S24, a check is made to find if a request for stopping the image pickup operation is received from the computer 3. If so, the flow comes to a step S25. If not, the flow comes back to the step S22 to continue the image pickup operation.

At the step S25, the routine A comes to an end. The image pickup operation at the CCD 11 is brought to a stop. At the same time, the lens unit 10, the CCD 11, the A/D converter 12, the DSP 13, the lens controller 15, the TG 16 and the light unit 19 stop from operating.

When the flow proceeds to the step S26, there are two modes for decreasing the amount of image data to be picked up per unit time. In one mode, the operator of the image pickup system decides to decrease the amount of image data picked up per unit time and gives an instruction for the execution of the decision. In the other mode, the image pickup unit 1 automatically decreases the amount of image data picked up per unit time. A choice between the two methods is set in the program 9 beforehand. In the case of the instruction from the operator, the flow comes to a step S27. In the case of the automatic execution by the image pickup unit 1, the flow proceeds to a step S28.

At the step S27, the current output mode of the TG 16 is changed by the operator to another mode which gives a suitable value among the output modes of the TG 16 mentioned in the foregoing description of the step S14 of the still image taking operation. As a result of the operation by the operator, the amount of picked-up image data to be sent out per unit time from the image pickup unit 1 to the computer 3 decreases. The flow then comes from the step S27 to a step S31.

At the step S28, the number of the output mode of the TG 16 mentioned in the foregoing description of the step S14 of the still image taking operation is decremented by one. In other words, with the current output mode of the TG 16 assumed to be the mode 3, the mode 3 is changed over to the mode 2. This change causes the amount of picked-up image data per unit time to decrease. Incidentally, the initial value of the mode is 3.

The image pickup unit 1 informs the computer 3 of the above-stated action when the output mode of the TG 16 is lowered. The computer 3 then displays this action on the display device 7.

At a step S29, a check is made to find if the output mode of the TG 16 has become the mode 0. If so, the mode 0 indicates that no moving image can be taken by the image pickup system. This result of check is obtained in a case where the picked-up image data reading speed of the computer 3 has lowered or when it is incapable of reading the data. If the output mode of the TG 16 is found to be the mode 0, the flow comes to a step S30. If not, the flow comes to the step S31.

At the step S30, an error processing action to be carried out in the event of the mode 0 is executed. The control unit 17 informs the computer 3 that the moving image taking action is impossible, and the flow comes to a step S25 to bring the routine A to an end.

At the step S31, the data currently stored in the FIFO memory 14 is read out by the routine B and a check is made for any vacancy in the storage capacity of the FIFO memory 14. If the flow signal is detected, the flow comes to a step S32. If not, the flow comes to the step S22.

At the step S32, the operation is suspended for a predetermined period of time. After that, the flow comes to the step S31 again to make a check for any vacancy in the storage capacity of the FIFO memory 14.

Figure 5:
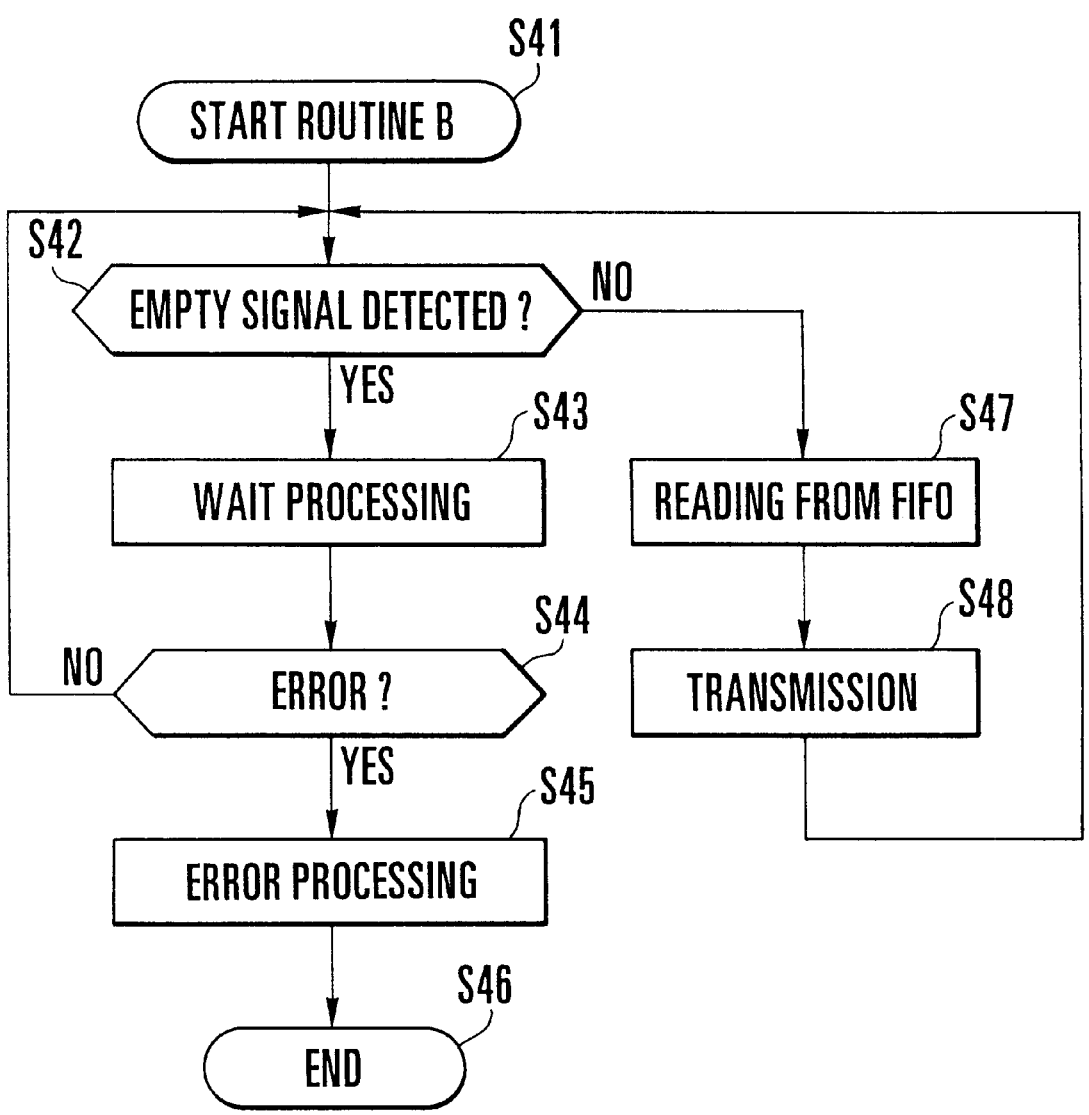
FIG. 5 is a flow chart showing a moving image pickup routine B in the first embodiment.

The routine B is next described with reference to FIGS. 1, 2 and 5 as follows.

At a step S41, the routine B begins. The following actions are all executed by the control unit 17:

At a step S42, a check is made for the state of the FIFO memory 14. The FIFO memory 14 sends an empty signal to the control unit 17 if it has no picked-up image data stored there at all. If the empty signal is detected, the flow comes to a step S43. If not, the flow comes to a step S47.

At the step S43, the flow of operation is suspended for a predetermined period of time to wait until the picked-up image data is stored in the FIFO memory 14.

At a step S44, check is made for a state of error. In other words, in a case where the action of the step S43 continues to a predetermined extent without executing the action of the step S47, this state indicates that the image pickup operation according to the routine A has not been performed at all. If this state is detected, the flow comes to a step S45. If not, the flow comes back to the step S42.

At the step S45, the error processing action is performed. The computer 3 is informed that the image pickup operation cannot be continued due to occurrence of an error. After the step S45, the flow comes to a step S46 to bring the routine B to an end.

When the flow comes from the step S42 to the step S47, the picked-up image data stored in the FIFO memory 14 is read out.

At a step S48, the picked-up image data read out at the step S47 is sent out to the computer 3.

(Second Embodiment)

An image pickup system which is a second embodiment of the invention is arranged in the same manner as the first embodiment and as shown in FIGS. 1 and 2. The operation of the second embodiment in each part is, however, not exactly the same as in the first embodiment. The still image taking operation of the second embodiment is the same as that of the first embodiment described in the foregoing. Therefore, the following description of the second embodiment omits its still image taking operation and covers only its moving image taking operation.

(Pickup of Moving Image)

When the image pickup unit 1 is connected to the computer 3, the image pickup unit 1 receives through the interface 18 an operation clock signal Clk0 from the computer 3. The operation clock signal Clk0 is of a frequency which is proportional to the processing speed of the computer 3. The operation clock signal Clk0 is inputted to the counter 20 from the interface (I/F) 18. The counter 20 is provided with a means for detecting the frequency Fc of the operation clock signal Clk0. Information on the frequency Fc detected is sent to the control unit 17.

The counter 20 receives from the control unit 17 a signal Oc which has a higher frequency than the signal Clk0 and uses it in measuring the frequency Fc. The frequency Fc of the signal Clk0 is measured by counting a number of times for which the signal Oc varies in one cycle of the signal Clk0. Information on the measured frequency Fc is stored at the control unit 17. If the intrinsic frequency Fc of the computer 3 is known, the value of the intrinsic frequency Fc may be stored beforehand at the control unit 17.

Then, the control unit 17 compares the frequency Fc with the output mode of the TG 16 which is arranged as mentioned at the step S14 of the foregoing description of the still image taking operation of the first embodiment. The output mode of the TG 16 is changed over to another output mode according to the result of the comparison.

The amount of image data picked up per unit time by the image pickup unit 1 can be adjusted to the processing speed of the computer 3 by this operation.

(Third Embodiment)

Figure 6:
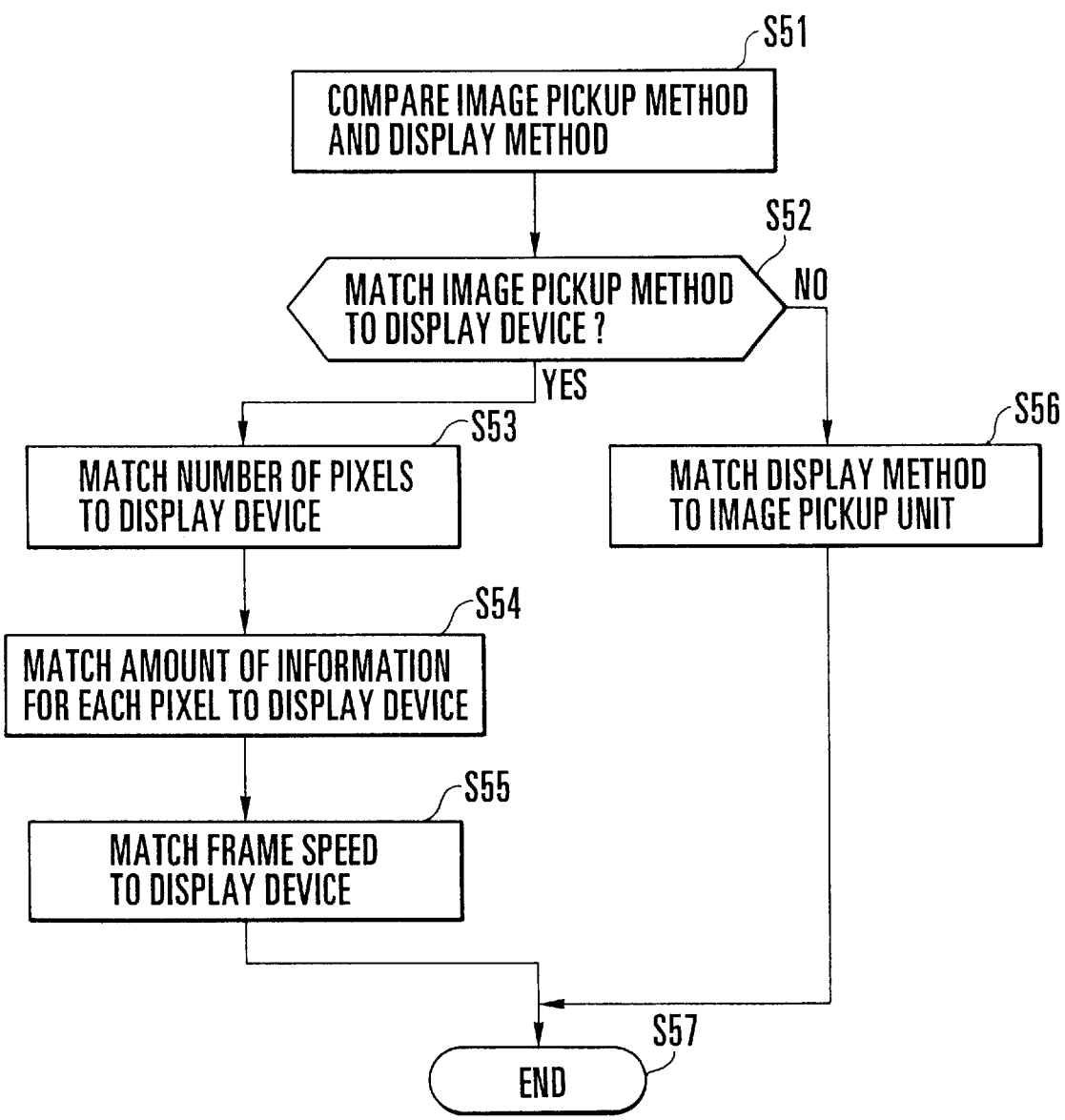
FIG. 6 is a flow chart showing an image pickup operation of a third embodiment of this invention.
Figure 7:
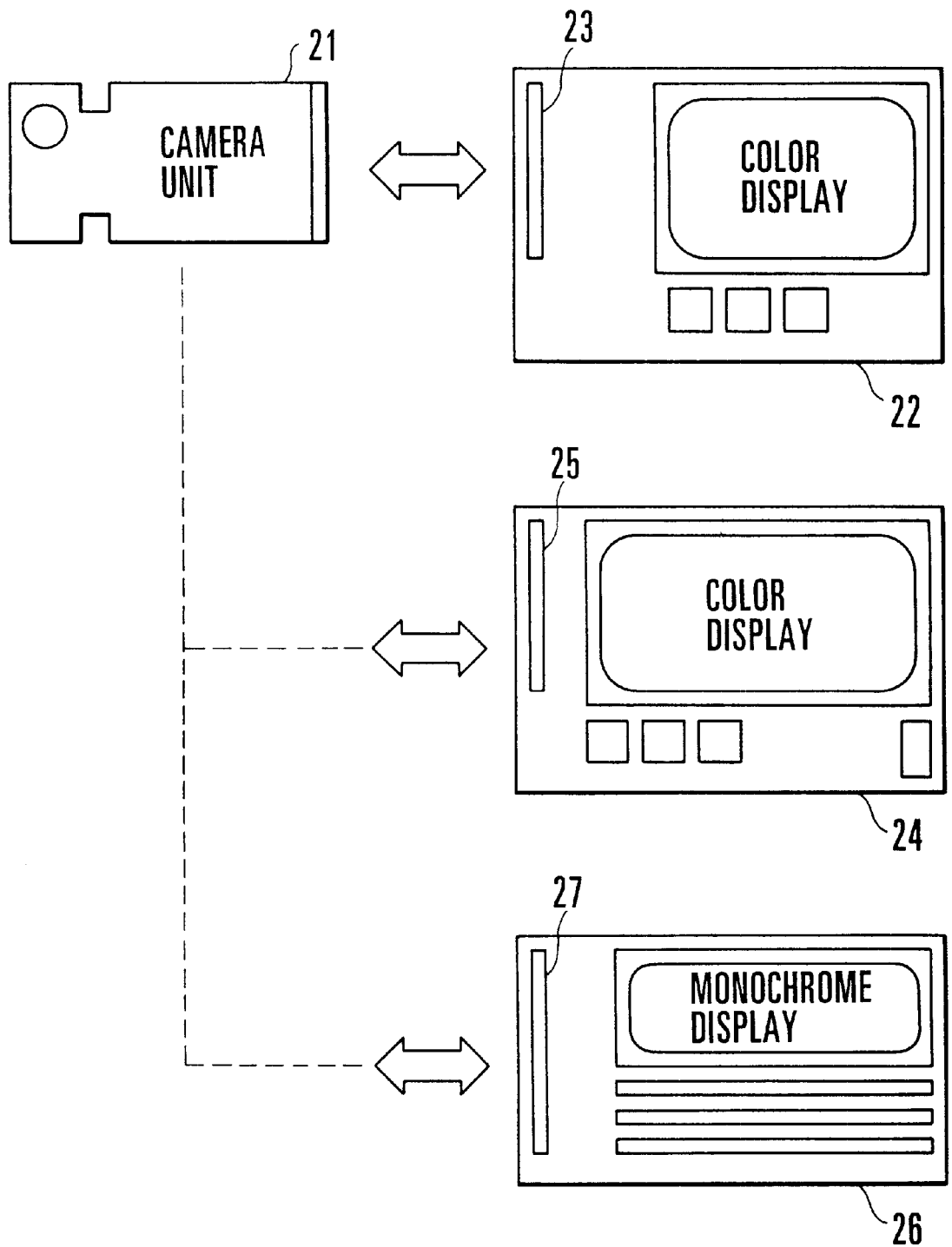
FIG. 7 is a block diagram showing by way of example the conventional image pickup system.

An image pickup system which is a third embodiment of the invention is described with reference to FIGS. 1, 2 and 6 as follows. The image pickup system is arranged in the same manner as the first embodiment described in the foregoing. However, its operation in each part differs from that of the first embodiment.

The image pickup unit 1 is connected to the computer 3 as shown in FIGS. 1 and 2. Then, the CPU 4 sends information on the display method of the display device 7 to the control unit 17. The control unit 17, which has stored information on an image pickup method used before, sends the information to the CPU 4.

The display method of the display device 7 is assumed to be as follows.

Resolution: 320 horizontal pixels and 240 vertical pixels per frame

Display speed: 10 frames per sec

Amount of information of one pixel: 8 bits, monochrome

The operation of the image pickup system which is the third embodiment of the invention is described with reference to the flow chart of FIG. 6 as follows.

At a step S51, the CPU 4 makes a comparison between the image pickup method of the image pickup unit 1 and the display method of the display device 7. Here, the image pickup method of the image pickup unit 1 is assumed to be as follows.

Resolution: 640 horizontal pixels and 480 vertical pixels per frame

Image pickup speed: 30 frames per sec

Amount of information of one pixel: color, 8 bits for each of colors R, G and B, 24 bits in all The CPU 4 informs the operator of the image pickup system of the display method of the display device 7 and the image pickup method of the image pickup unit 1.

At a step S52, depending on whether the operation is performed by the operation program 9 or by the operator of the image pickup system, either of the following actions (a) and (b) is selected.

(a) The image pickup method of the image pickup unit 1 is matched to the display method of the display device 7.

(b) The display method of the display device 7 is matched to the image pickup method of the image pickup unit 1.

If the display method of the display device 7 is fixed, the action (a) is selected and the flow comes to a step S53. If the action (b) is selected, the flow comes to a step S56.

At the step S53, the DSP 13 performs a processing to match the number of pixels of the picked-up image data outputted from the image pickup unit 1 to the display method of the display device 7. Since the number of pixels of the picked-up image data is larger than the number of pixels that can be displayed by the display device 7 in this instance, the numbers of pixels both in the vertical and horizontal directions are respectively reduced to one half.

At a step S54, the DSP 13 causes the amount of information carried by each pixel of the picked-up image data to be matched to the amount of information that can be displayed by the display device 7. In the case of this embodiment, the display device 7 is capable of displaying only in monochrome and the amount of information of each pixel of it is only 8 bits. The amount of information of each pixel of the picked-up image data is, on the other hand, 24 bits. In this case, therefore, only the data of color G (8 bits) of the picked-up image data is sent to the display device 7.

At a step S55, the DSP 13 causes the frame speed of the picked-up image data to be matched to the display speed of the display device 7. Since the display speed of the display device 7 is 10 frames/sec while the image pickup speed of the image pickup unit 1 is 30 frames/sec in this case, picked-up image data of one of every three frames is selected and sent to the display device 7.

At the step S56, the display method of the display device 7 is matched to the image pickup method of the image pickup unit 1. It might be impossible to display the whole amount of information carried by the picked-up image data. However, this action (b) is selectable in a case where, for example, the whole picked-up image data is stored in the memory device 8 without displaying the picked-up image data in its entirety.

The flow of operation comes to an end at a step S57.

The image pickup method of the image pickup unit 1 is matched to the display method of the display device 7 by the steps S51 through S56. After completion of the matching process, the image pickup unit 1 is allowed to perform the image pickup operation.

As apparent from the foregoing description, a means for controlling the image pickup mode of the image pickup unit 1 may be disposed either within the image pickup unit 1 or on the side of the computer 3 which is serving as an external picked-up image signal processing means.

According to the arrangement of the embodiments described above, the function of processing the picked-up image signal formed by the image pickup unit and the function of controlling the image pickup operation are arranged to be performed in part within the external picked-up image signal processing apparatus. The arrangement, therefore, permits reduction of the size of the image pickup unit, so that the image pickup unit can be formed in a card-like shape, such as a card of the PCMCIA standards, like in the case of the embodiments described above.

The conventional method of processing a picked-up image signal with a computer or the like has necessitated a process of converting the picked-up image signal into a signal conforming to the television format of the NTSC system or the like before converting it into a digital signal for the computer. The conventional method thus involves some duplicating part in processing the signal. Such wasteful process can be avoided according to the arrangement of the embodiments described above.

Further, according to the arrangement of the embodiments of the invention, an image pickup function can be added to a signal processing apparatus such as a computer without necessitating any complex arrangement.

It is particularly advantageous feature of the image pickup system that the capability of the image pickup unit is adjusted to the signal processing capability such as the signal processing speed and the display capability of the signal processing apparatus. In accordance with the invention, therefore, the signal processing operation can be optimized to eliminate any wasteful process. The invention, therefore, gives a system which processes signals at an optimum speed and also reduces the power consumption of the whole system.

What is claimed is:

1. An image pickup system composed of an image pickup unit for picking up an optical image to form an image signal and at least one external apparatus which is connected to said image pickup unit, said image pickup unit comprising:

data receiving device for receiving information on image displaying ability functioning in said connected external apparatus from external apparatus connected;

comparison device for making a comparison between the information on the image displaying ability functioning in said connected external apparatus received by the data receiving device and an action of said image pickup unit; and varying control device for varying the action of said image pickup unit so as to control an amount of pickup image signal which is transmitted to said external apparatus according to a result of the comparison.

2. A system according to claim 1, further comprising display varying device for varying an image displaying method of said external apparatus according to the result of the comparison made by said comparison device or according to the operation performed by the operator of said image pickup system.

3. A system according to claim 1, further comprising informing device for informing one of or all of the operator of said image pickup system, said external apparatus and said image pickup unit of the result of the comparison made by said comparison device.

4. A system according to claim 1, wherein, when said image pickup unit obtains a plurality of pixel data, said varying control device selects and outputs at least one pixel data from among the plurality of pixel data.

5. A system according to claim 1, wherein said varying control device is arranged to vary the number of frames of images to be picked up per unit time by said image pickup unit.

6. A system according to claim 1, wherein said varying control device is arranged to select and output picked-up image data for at least one picture from among picked-up image data for a plurality of pictures being sent out at intervals of a predetermined length of time from said image pickup unit.

7. A system according to claim 1, wherein, when said image pickup unit obtains picked-up image data for one frame composed of a plurality of pixel rows, said varying control device selects and outputs picked-up image data for a fewer number of pixel rows than the plurality of pixel rows.

8. A system according to claim 1, wherein, when said image pickup unit obtains picked-up image data for one frame composed of a plural number of colors, said varying control device selects and outputs data for an arbitrary number of colors from among the picked-up image data.

9. A system according to claim 1, wherein said varying control device is arranged to increase or decrease an amount of information carried by each of pixels with which said image pickup unit forms the picked-up image data.

10. A system according to claim 1, wherein said varying control device detects or predicts a display speed of an image display device included in said external apparatus connected.

11. A system according to claim 1, wherein said varying control device detects or predicts a resolution of an image display device included in said external apparatus connected.

12. A system according to claim 1, wherein said varying control device detects or predicts an amount of color information to be displayed by an image display device included in said external apparatus connected.

13. An image pickup unit, which is connected to an external signal processing apparatus, comprising:

image pickup device for picking up an optical image to form a picked-up image signal;

receiving device for receiving information of a displaying capability characteristic of a display device of said external signal processing apparatus from said external signal processing apparatus; and control device for changing an action of said image pickup unit so as to control an amount of image data which is transmitted to said external signal processing apparatus on the basis of the information on the displaying capability characteristic.

14. A unit according to claim 13, wherein said control means is arranged to change the image pickup operation by changing an amount of information per unit time of the picked-up image signal to be formed by said image pickup means.

15. A unit according to claim 13, wherein said control means is arranged to change the image pickup operation by changing an amount of color information of the picked-up image signal to be formed by said image pickup means.

16. A picked-up image signal processing apparatus, to which an image pickup unit including image pickup device for picking up an optical image to form an image signal is removably connected, comprising:

a displaying device having a predetermined displaying capability, for displaying a picked-up image from said image pickup unit; and a transmitting device for transmitting to said image pickup unit information on said predetermined displaying capability of said displaying device so as to control an amount of image data which is transmitted to said picked-up image signal processing apparatus corresponding to said predetermined displaying capability.

17. An apparatus according to claim 16, wherein said transmitting device transmits said information so as to change the image pickup operation by changing an amount of information per unit time of the picked-up image signal to be formed by said image pickup unit.

18. An apparatus according to claim 16, wherein said transmitting device transmits said information so as to change the image pickup operation by changing an amount of color information of the picked-up image signal to be formed by said image pickup unit.

19. A method for controlling an image pickup unit for picking up an optical image to form a picked-up image signal, which is connected to an external signal processing apparatus, comprising:

receiving information of a displaying capability characteristic of a display device of said external signal processing apparatus from external signal processing apparatus; and controlling an action of said image pickup unit on the basis of the information on the displaying capability characteristic.

20. A method according to claim 17 wherein said controlling includes changing the action of said image pickup unit by changing an amount of information per unit time of the picked-up image signal to be formed by said image pickup unit.

21. A method according to claim 17 wherein said controlling includes changing the action of said image pickup unit by changing an amount of color information of the picked-up image to be formed by said image pickup unit.

22. The image pickup unit according to claim 13, wherein said control device changes the action of said image pickup unit according to an operation performed by an operator of said image pickup unit.

* * * * *